United States Patent [19]

Sekiraku

[11] Patent Number: 4,685,208
[45] Date of Patent: Aug. 11, 1987

[54] APPARATUS FOR ASSEMBLING VEHICLE BODIES
[75] Inventor: Akira Sekiraku, Hiroshima, Japan
[73] Assignee: Mazda Motor Corporation, Japan
[21] Appl. No.: 795,889
[22] Filed: Nov. 7, 1985
[30] Foreign Application Priority Data Nov. 15, 1984 [JP] Japan .............................. 59-241458
Nov. 15, 1984 [JP] Japan .............................. 59-241459
Nov. 15, 1984 [JP] Japan .............................. 59-241460

[51] Int. Cl.$^4$ .................... B23P 21/00; B23P 19/00
[52] U.S. Cl. ................................ 29/786; 29/822; 29/824
[58] Field of Search ............... 29/822, 824, 430, 791, 29/793, 794, 786

[56] References Cited

U.S. PATENT DOCUMENTS 4,589,184 5/1986 Asano et al. ................... 29/824
4,589,199 5/1986 Ohtaki et al. .................. 29/824

FOREIGN PATENT DOCUMENTS 52-34480  3/1977 Japan ..................... 29/430
53-8884   1/1978 Japan .
53-36627 10/1978 Japan ..................... 29/824
54-5276   1/1979 Japan ..................... 29/824
59-23782  2/1984 Japan ..................... 29/700
60-135383 7/1985 Japan ..................... 29/700

Primary Examiner—Howard N. Goldberg
Assistant Examiner—Steven Nichols
Attorney, Agent, or Firm—Gerald J. Ferguson, Jr.; Michael P. Hoffman; Ronni S. Malamud

[57] ABSTRACT

An apparatus for assembling vehicle bodies which is provided in a vehicle body production line and operative to mount various parts on vehicle bodies conveyed thereinto after passing through a coating process, comprises first door conveying means for transporting doors detached from the vehicle bodies having passed through the coating process, door storing means for temporarily storing the doors transported by the first door conveying means, door assembly line means for mounting the door parts on each of the doors forwarded from the door storing means after being temporarily stored therein, and second door conveying means for transporting the doors each provided with the door parts from the door assembly line means to a door mounting station provided in the vehicle body production line to which the vehicle bodies each provided with the body parts are conveyed.

9 Claims, 4 Drawing Figures

APPARATUS FOR ASSEMBLING VEHICLE BODIES

BACKGROUND OF THE INVENTION

1. Field of the Invention

The present invention generally relates to apparatus for assembling vehicle bodies, and more particularly, is directed to improvements in a vehicle body assembling apparatus which is provided in a vehicle body production line and operative to mount various parts on vehicle bodies conveyed thereinto after passing through a coating process.

2. Description of the Prior Art

There has been previously proposed a vehicle body assembling apparatus which is installed in a vehicle body production lne so as to be operative to detach doors from vehicle bodies conveyed into the apparatus after passing through a coating process and to mount various door parts and body parts on each of the doors detached from the vehicle bodies and each of the vehicle bodies without the doors, respectively, then to attach each of the doors provided fully with the door parts to the corresponding vehicle body provided fully with the body parts, as disclosed in, for example, the Japanese patent application published before examination with the publication No. 53/8884 on Jan. 26, 1978. In such an apparatus, the doors detached from the vehicle bodies are transported to a door assembly line through a door conveying device comprising a plurality of overhead conveying carriers and a plurality of door hangers each connected to the overhead conveying carrier, and the doors on each of which the door parts are mounted in the door assembly line are further transported to a door mounting station in the vehicle body production line, to which the vehicle bodies each provided fully with the body parts are conveyed.

In the case of the apparatus mentioned above, it is required that the time lapsed during a body parts mounting period from a process in which the door is detached from the vehicle body to an advanced process in which the vehicle body provided fully with the body parts is conveyed to the door mounting station is equal to the time lapsed during a door parts mounting period from the process in which the door is detached from the vehicle body to another advanced process in which the door provided fully with the door parts is conveyed through the door assembling line to the door mounting station. However, the number of the body parts mounted on the vehicle body without doors is much greater than the number of the door parts mounted on the door, and therefore, in fact, the time lapsed during the body parts mounting period is longer almost beyond comparison than the time lapsed during the door parts mounting period. Accordingly, in practice, the door conveying device is controlled to transport each of the doors at extremely slow speed or to carry each of the doors along a predetermined roundabout path to the door mounting station, in order to prolong the time lapsed during the door parts mounting period so as to be substantially proportionate to the time lapsed during the body parts mounting period.

For such a control for prolonging the time lapsed during the door parts mounting period, the door conveying device is required to have a large number of door hangers and consequently a housing structure supporting the door conveying device must necessarily be constructed firmly enough to support the device. This results in a problem that the expenses of facilities are considerably increased, and further in a disadvantage that the increase in the number of door hangers generates loud noises.

OBJECTS AND SUMMARY OF THE INVENTION

Accordingly, it is an object of the present invention to provide an apparatus for assembling vehicle bodies which avoids the foregoing problems encountered with the prior art.

Another object of the present invention is to provide an apparatus for assembling vehicle bodies, which is operative to detach doors from vehicle bodies conveyed into the apparatus after passing through a coating process and to mount various door parts and body parts on each of the doors and each of the vehicle bodies without doors, respectively, then to attach each of the doors provided with the door parts to the corresponding vehicle body provided with the body parts, and in which a door conveying device for transporting the doors detached from the vehicle bodies by the use of door hangers can be arranged to have a reduced number of the door hangers.

A further object of the present invention is to provide an apparatus for assembling vehicle bodies, which is operative to detach doors from vehicle bodies conveyed into the apparatus after passing through a coating process and to mount various door parts and body parts on each of the doors and each of the vehicle bodies without doors, respectively, then to attach each of the doors provided with the door parts to the corresponding vehicle body provided with the body parts, and in which a door storing device is provided for temporarily storing the doors detached from the vehicle bodies and transported by a door conveying device with door hangers, so that the door conveying device is not required to have a prolonged time for transporting each of the doors and therefore can be arranged to have a reduced number of the door hangers.

A further object of the present invention is to provide an apparatus for assembling vehicle bodies, which is operative to detach doors from vehicle bodies conveyed into the apparatus after passing through a coating process and to mount various door parts and body parts on each of the doors and each of the vehicle bodies without doors, respectively, then to attach each of the doors provided with the door parts to the corresponding vehicle body provided with the body parts, and in which each of the doors detached from the vehicle bodies and transported by a door conveying device are temporarily stored in a door storing device which is miniaturized in scale, and then forwarded from the door storing device with an attitude appropriate for being provided with the door parts thereon.

A still further object of the present invention is to provide an apparatus for assembling vehicle bodies, which is operative to detach doors from vehicle bodies conveyed into the apparatus after passing through a coating process and to mount various door parts and body parts on each of the doors and each of the vehicle bodies without doors, respectively, then to attach each of the doors provided with the door parts to the corresponding vehicle body provided with the body parts, and in which the doors detached from the vehicle bodies and transported by a door conveying device are temporarily stored in such a manner as to be sorted in dependence of on the types thereof in a door storing device which is miniaturized in scale.

According to an aspect of the present invention, there is provided an apparatus for assembling vehicle bodies which is operative to detach doors from vehicle bodies conveyed into the apparatus after passing through a coating process and to mount various door parts and body parts on each of the doors and each of the vehicle bodies without doors, respectively, then to attach each of the doors provided with the door parts to the corresponding vehicle body provided with the body parts, the apparatus comprising: first door conveying means for transporting the doors detached from the vehicle bodies, door storing means for temporarily storing the doors transported by the first door conveying means, door assembly line means for mounting the door parts on each of the doors forwarded from the door storing means after being temporarily stored therein, and second door conveying means for transporting the doors each provided with the door parts from the door assembly line means to a door mounting station in a vehicle body production line to which the vehicle bodies each provided with the body parts are conveyed.

In a preferred embodiment of apparatus according to the present invention taken by way of example, the door storing means is supplied with the doors each placed on a supporting table moved forward in a predetermined direction and causes the doors placed on the supporting tables to stay therein in such a manner that each of the doors stands in the direction almost perpendicular to the direction in which the supporting tables are forwarded, and door turning means is additionally provided at the side of exit of the door storing means for turning the direction of each of the doors on the supporting tables so as to stand in the direction almost parallel to the direction in which the supporting tables are forwarded.

Further, in the embodiment of apparatus according to the present invention, the door storing means has therein a plurality of storing compartments for storing the doors transported by the first door conveying means in such a manner that the doors of the same type are stored in a group in each storing compartment, and door supplying means and door taking out means are provided at the sides of entrance and exit of the door storing means, respectively. The door supplying means is operative to sort the doors transported by the first door conveying means in dependence on the types thereof and supply each sorted door to the corresponding storing compartment in the door storing means, and the door taking out means is operative to take out the sorted doors from the respective storing compartments in the door storing means. For example, in the case of the apparatus for assembling vehicle bodies of the four-door sedan type, the door storing means has a first pair of storing compartments positioned on right and left for storing right and left front doors, respectively, and a second pair of storing compartments positioned on right and left, and above or below the first pair of storing compartments, for storing right and left rear doors, respectively. In such a case, the door storing means for storing the right and left front doors and the right and left rear doors separately is miniaturized in scale in its entirety.

In the apparatus thus constituted in accordance with the present invention, the doors detached from the vehicle bodies and transported by the first door conveying means are temporarily stored in the door storing means, and therefore, even though there is a large difference between the time lapsed during a period necessitated for mounting of the body parts on each of the vehicle bodies on the vehicle body production line and the time lapsed during a period necessitated for mounting of the door parts on each of the doors in the door assembly line means, neither the first door conveying means nor the second door conveying means are required to have a prolonged time for transporting each of the doors. Accordingly, the first and second door conveying means can be arranged to have a reduced number of door hangers for suspending and conveying the doors. Further, the door hangers thus reduced in number are certainly effective to lighten the burden on a housing structure supporting the first and second door conveying means and to reduce noise generated thereby.

In the embodiment provided with the door turning means at the side of exit of the door storing means as described above, since the doors are temporarily stored in the door storing means in such a manner as to save space, and then each of the doors stored temporarily is forwarded to the door assembly line means with an attitude appropriate for being provided with the door parts thereon, the door storing means can be miniaturized in space and the door parts are easily mounted on each of the doors in the door assembly line means so that the labour efficiency is increased.

Furthermore, in the embodiment provided with the door storing means having a plurality of storing compartments for storing a plurality of groups of doors sorted in dependence of types thereon the separately as also described above, the door storing means which is required to store the doors of plural different types can be miniaturized in scale in its entirety.

The above, and other objects, features and advantages of the present invention will become apparent from the following detailed description which is to be read in conjunction with the accompanying drawings.

DESCRIPTION OF THE PREFERRED EMBODIMENT

Now, an embodiment of apparatus for assembling vehicle bodies according to the present invention will be described in detail with reference to the accompanying drawings hereinafter.

Figure 1:
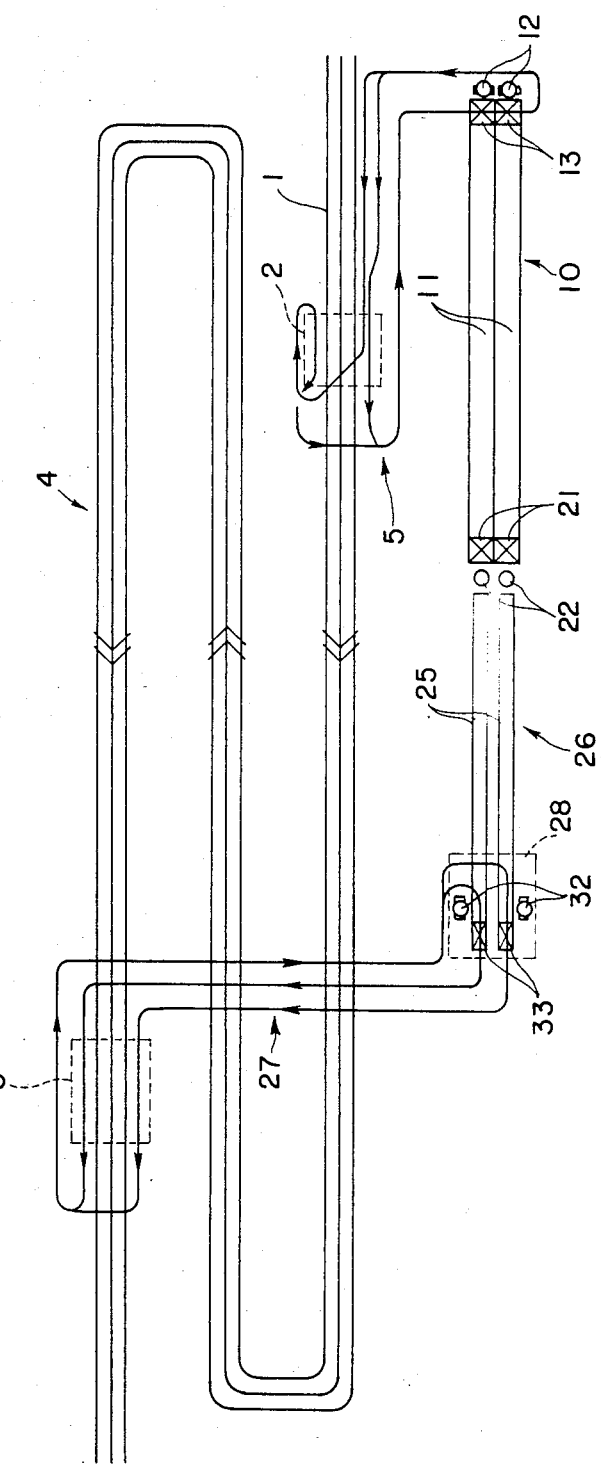
FIG. 1 is a schematic plane view showing an embodiment of apparatus for assembling vehicle bodies according to the present invention.
Figure 2:
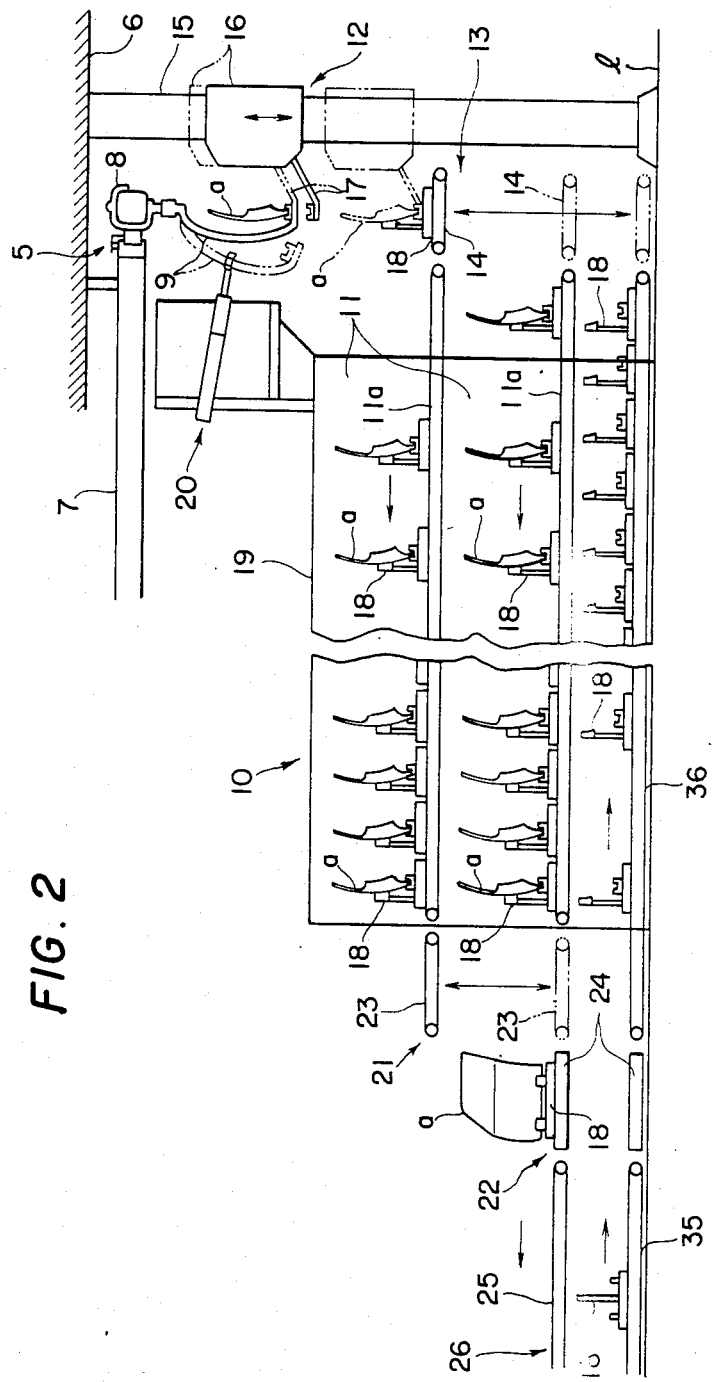
FIG. 2 is a schematic side view showing a portion of the embodiment of FIG. 1 in which a door storing device is included.
Figure 3:
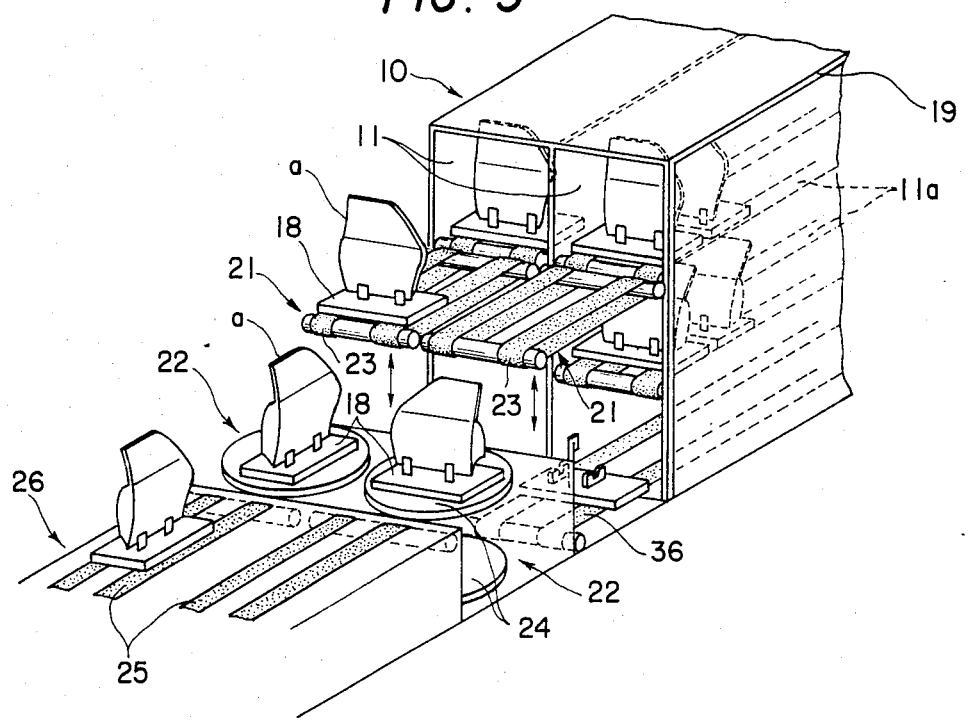
FIG. 3 is a schematic perspective view showing a portion of the embodiment of FIG. 1 in which the side of exit of the door storing device shown in FIG. 2 is included.
Figure 4:
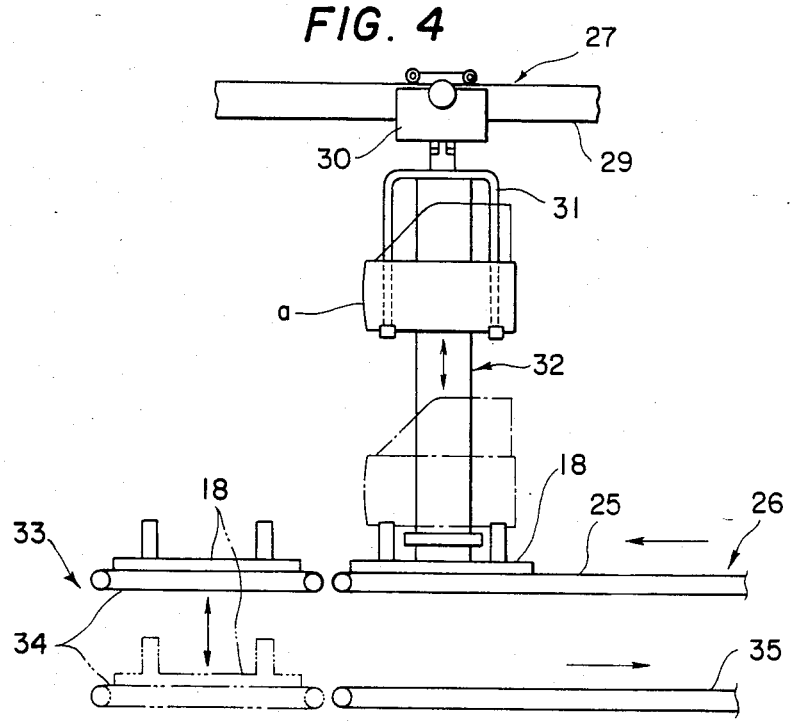
FIG. 4 is a schematic side view showing a portion of the embodiment of FIG. 1 in which a part of a door assembly line is included.

FIG. 1 shows schematically one example of the apparatus according to the present invention which is applied for assembling vehicle bodies of the four-door sedan type and FIGS. 2 to 4 show in detail various portions of the example shown in FIG. 1.

Referring to FIG. 1, a vehicle body conveyer 1 by which vehicle bodies having passed through a coating process are conveyed is installed so as to meander to extend over a relatively long distance. At the upper course of the vehicle body conveyer 1, a door removing station 2 where doors attached to each vehicle body on the vehicle body conveyer 1 are detached is provided to be supplied with the vehicle bodies from a station of the coating process. On the other hand, at the lower course of the vehicle body conveyer 1, a door mounting station 3 is provided where the door which is detached from the vehicle body at the door removing station 2 and on which various door parts are mounted at a door assembly line 26 which is described in detail later, is attached to the corresponding vehicle body conveyed thereto from the door removing station 2 through the vehicle body conveyer 1. Further, between the door removing station 2 and the door mounting station 3, a plurality of parts mounting stations (not shown in the drawings) at each of which body parts, such as various interior parts, seats and so on, are mounted on each of the vehicle bodies on the vehicle body conveyer 1 are provided along the vehicle body conveyer 1. These parts mounting stations and the vehicle body conveyer 1 constitute a body assembly line 4.

At a position apart from the vehicle body conveyer 1, a door storing device 10 is located for storing temporarily the doors detached from the vehicle bodies at the door removing station 2, and a first door conveying device 5 is provided for transporting the doors detached from the vehicle bodies to the door storing device 10 from the door removing station 2. As shown in FIG. 2, the first door conveying device 5 is formed into a so-called electric self-propelling conveyer comprising an overhead rail 7 supported by a ceiling beam 6 of a housing structure, a plurality of carriers 8 each engaging with the overhead rail 7 to propel along the overhead rail 7, and a plurality of door hangers 9 each connected to the carrier 8 for suspending the door a detached from the vehicle body at the door removing station 2.

The door storing device 10 has a frame member 19 in which a pair of storing compartments 11 each provided with a belt conveyer 11a are formed on right and left at a lower storey and another pair of storing compartments 11 each provided also with a belt conveyer 11a are formed on right and left at a upper storey, as shown in FIGS. 2 and 3. On the side of entrance of each of the storing compartments 11 positioned on the right at the upper and lower storeys, a door transferring device 12 and a door supplying device 13 are provided, and on the side of entrance of each of the storing compartments 11 positioned on the left at the upper and lower storeys, another door transferring device 12 and another door supplying device 13 are provided, as shown in FIGS. 1 and 2.

Each door supplying device 13 has a small belt conveyer 14 on which the door a is placed and which is driven to go up and down between a floor level 1 and the level of the storing compartments 11 provided on right and left at the upper storey. Each door transferring device 12 comprises a moving support member 16 going up and down along a strut 15 and a door holder 17 extending from the moving support member 16. The moving support member 16 goes down after the door holder 17 receives the door a from the door hanger 9 of the first door conveying device 5 and causes the door a to stand on a supporting table 18 which is previously shifted on the small belt conveyer 14 of the door supplying device 13.

The operation of each of the door transferring devices 12 and the door supplying devices 13 are controlled by a control unit (not shown in the drawings) which has a door discriminator for detecting the type of each door a from the first door conveying device 5, so that the door transferring device 12 provided on the side of the storing compartments 11 positioned on the right is caused to operate to transfer the door a from the first door conveying device 5 to the supporting table 18 of the door supplying device 13 provided on the side of the storing compartments 11 positioned on the right when the door a is a right door, while the door transferring device 12 provided on the side of the storing compartments 11 positioned on the left is caused to operate to transfer the door a from the first door conveying device 5 to the supporting table 18 of the door supplying device 13 provided on the side of the storing compartments 11 positioned on the left when the door a is a left door. Further, each door supplying device 13 receives the door a transferred to the supporting table 18 on the small belt conveyer 14 thereof from the first door conveying device 5 through the corresponding door transferring device 12 at the level of the storing compartments 11 at the upper storey, and then supplies the door a, together with the supporting table 18, to the belt conveyer 11a in the storing compartment 11 at the upper storey directly when the door a is a rear door or causes the small belt conveyer 14 to go down to the level of the storing compartments 11 at the lower storey so as to supply the door a, together with the supporting table 18, to the belt conveyer 11a in the storing compartment 11 at the lower storey, when the door a is a front door.

Incidentally, after the door a is shifted to the door holder 17 of the door transferring device 12 from the door hanger 9 of the first door conveying device 5, the door hanger 9 is moved to be away from the door transferring device 12 by a hanger tilting device 20 comprising a cylinder actuator provided on the frame member 19 of the door storing device 10 so that the door a is transferred to the supporting table 18 on the door supplying device 13 from the door holder 17 of the door transferring device 12 without being disturbed by the door hanger 9.

The belt conveyer 11a in each of the storing compartments 11 transports the door a placed on the supporting table 18 and supplied from the door supplying device 13 in the direction to the exit of each storing compartment 11 and the supporting table 18 is ceased to move by a stopper (not shown in the drawings) around the exit of the storing compartment 11 so that the door a is temporarily stored in the storing compartment 11. After the door a is stored for a predetermined duration, the supporting table 18 is released from locking by the stopper and the door a is forwarded from the storing compartment 11 through the exit thereof by the belt conveyer 11a therein. For forwarding the door a from the storing compartment 11, the belt conveyer 11a may be intermittently driven.

As described above, the doors a of different types, that is, the right and left front doors and the right and left rear doors are supplied separately to the respective storing compartments 11 in the door storing device 10 through the door transferring devices 12 and the door supplying devices 13 which are controlled by the control unit having the door discriminator, so that the right and left front doors are temporarily stored in the storing compartments 11 positioned on right and left at the lower storey, respectively, and the right and left rear doors are temporarily stored in the storing compartments 11 positioned on right and left at the upper storey, respectively. In each storing compartment 11, the doors a on the respective supporting tables 18 are arranged in parallel with one another in such a manner that each door a is set to be in the direction perpendicular to the direction in which the supporting tables 18 are forwarded.

On the side of exit of each of the storing compartments 11 positioned on the right at the upper and lower storeys, a door taking out device 21 and a door turning device 22 are provided, and on the side of exit of each of the storing compartments 11 positioned on the left at the upper and lower storeys, another door taking out device 21 and another door turning device 22 are provided, as shown in FIGS. 1 to 3. Each door taking out device 21 has a small belt conveyer 23 and is driven to go up and down between the level of the storing compartments 11 at the lower storey and the level of the storing compartments 11 at the upper storey so as to be receive the front door or the rear door forwarded from the storing compartment 11, together with the supporting table 18, with the small belt conveyer 23. Each door turning device 22 comprises a pair of turntables 24 provided at the level of the storing compartments 11 at the lower storey and the floor level 1, respectively. The turntable 24 provided at the level of the storing compartments 11 at the lower storey receives the door a taken out through the door taking out device 21 from the storing compartment 11 to turn the supporting table 18 by about ninety degrees of an angle so that the door a on the supporting table 18 is in parallel with the direction in which the supporting tables 18 are forwarded, and then forwards the supporting tables 18 turned together with the door a to the door assembly line 26.

The door assembly line 26 has a pair of belt conveyers 25 which are provided so as to extend from the turntables 24 of the respective door turning device 22 provided at the level of the storing compartments 11 at the lower storey, and each belt conveyer 25 transports the doors a placed on the respective supporting tables 18 successively. On the outer sides of the belt conveyers 25, a plurality of parts mounting stations (not shown in the drawings) at each of which door prats are mounted on each of the doors a on the belt conveyers 25 are provided along the belt conveyers 25. The door assembly line 26 thus comprising the belt conveyers 25 and the parts mounting stations provided along the belt conveyers 25 is formed to be very short in comparison with the body assembly line 4, because the number of the door parts mounted on each door a is much smaller than the number of the body parts mounted on each vehicle body from which the doors a are detached.

At the position including the end portion of the door assembly line 26, a door transferring station 28 is located, and a second door conveying device 27 is provided for transporting the doors a, which are transferred from the belt conveyers 25 in the door assembly line 26 through the door transferring station 28, to the door mounting station 3 in the body assembly line 4, as shown in FIG. 1. As shown in FIG. 4, the second door conveying device 27 is formed into an electric self-propelling conveyer comprising an overhead rail 29, a plurality of carriers 30 each engaging with the overhead rail 29 to propel along the overhead rail 29, and a plurality of door hangers 31 each connected with the carrier 30 for suspending the door a, in a similar manner as the first door conveying device 5. In the door transferring station 28, a pair of door transferring devices 32 are provided on the outer sides of the belt conveyers 25 for transferring each door a on which the door parts are mounted in the door assembly line 26 to the door hanger 31 of the second door conveying device 27 from the supporting table 18 on the belt conveyer 25. Each of these second door transferring devices 32 is constituted in the same manner as the first door transferring device 12.

In the door transferring station 28, a pair of lifters 33 are also provided at the ends of the belt conveyers 25, respectively. Each lifter 33 has a small belt conveyer 34 which is driven to go up and down between the level of each belt conveyer 25 and the floor level 1. Further, as shown in FIGS. 2 or 4, belt conveyers 35 and 36 are provided on the floor level 1 under the belt conveyers 25 in the door assembly line 26 and under the storing compartments 11 at the lower storey of the door storing device 10, respectively. These belt conveyers 35 and 36 and the lifters 33 are operative to transport each supporting table 18 from which the door a has been removed at the door transferring station 28 to the door transferring devices 12 in cooperation with the turntables 24 of the door turning device 22 which are provided on the floor level 1 to turn the supporting table 18 conveyed thereto through the belt conveyer 35 by an angle of about ninety degrees.

Next, the operation of the embodiment constituted as described above will be explained hereinafter.

In the embodiment shown in FIG. 1, the vehicle bodies of the four-door sedan type which have passed through the coating process are successively conveyed into the door removing station 2 through the vehicle body conveyer 1, and the right and left front doors and the right and left rear doors are detached from each of the vehicle bodies at the door removing station 2. Each vehicle body from which the doors are detached is transported to the body assembly line 4 from the door removing station 2 and provided with the body parts thereon at each of the parts mounting stations in the body assembly line 4. Then, the vehicle bodies on each of which the body parts are fully mounted are successively conveyed to the door mounting station 3.

On the other hand, as shown in FIG. 2, the doors a which are detached from the vehicle bodies are successively transported through the first door conveying device 5 to the location close to the entrance of the door storing device 10 having four storing compartments 11 therein, and then supplied to the four storing compartments 11 through the door transferring devices 12 and the door supplying devices 13 which are provided on the side of entrance of the door storing device 10 to be temporarily stored for a predetermined duration in the respective storing compartments 11.

In such storage of doors in the door storing device 10, the doors a are sorted in dependence on the types thereof and each sorted door a is stored in the corresponding storing compartment 11. That is, the right front doors, the left front doors, the right rear doors and the left rear doors are stored in the storing compartment 11 positioned on the right at the lower storey, the storing compartment 11 positioned on the left at the lower storey, the storing compartment 11 positioned on the right at the upper storey and the storing compartment 11 positioned on the left at the upper storey, respectively. In each storing compartment 11, the doors a are arranged to be parallel with one another in such a manner that each door a is placed on the supporting table 18 so as to be in the direction almost perpendicular to the direction in which the supporting tables 18 are forwarded by the belt conveyer 11a provided in the storing compartment 11.

After being stored for the predetermined duration in the respective storing compartments 11, each door a placed on the supporting table 18 is transferred to the turntable 24 of the door turning device 22, which is provided at the level of the storing compartments 11 at the lower storey, through the door taking out device 21 from the storing compartments 11. The door a put on the turntable 24 is turned by an angle of about ninety degrees so as to be parallel with the direction in which the supporting tables 18 are forwarded, and then transferred to the door assembly line 26. The doors a on the door assembly line 26 are transported successively to the parts mounting stations provided along the door assembly line 26, at each of which the door parts are mounted on each door a.

Each door a on which the door parts are fully mounted in the door assembly line 26 is transferred to the second door conveying device 27 from the supporting table 18 through the door transferring device 32 at the door transferring station 28 and conveyed to the door mounting station 3 in the body assembly line 4 by the second door conveying device 27.

The above mentioned predetermined duration for storing the doors a in the storing compartments 11 in the door storing device 10 is so selected that the time lapsed during a body parts mounting period from the process in which the doors a are detached from one of the vehicle bodies at the door removing station 2 to the process in which the vehicle body fully provided with the body parts in the body assembly line 4 is conveyed to the door mounting station 3 coincides substantially with the time lapsed during a door parts mounting period from the process in which the doors a are detached from one of the vehicle bodies at the door removing station 2 to the process in which the doors a which are detached from the same vehicle body and each of which is fully provided with the door parts in the door assembly line 26 are conveyed to the door mounting station 3.

Then, at the door mounting station 3, each of the door a fully provided with the door parts thereon is attached to the corresponding vehicle body on which the body parts are fully mounted, so completing to mount the parts on the vehicle body after passing through the coating process.

In the embodiment described above, since each of the doors a detached from the vehicle bodies is temporarily stored for the predetermined duration in the door storing device 10 before it is conveyed to the door assembly line 26, neither the first door conveying device 5 nor the second door conveying device 27 is required to have a prolonged time for transporting each of the doors a in order to cause the time lapsed during the door parts mounting period to coincide with the time lapsed during the body parts mounting period. Accordingly, the carriers 8 and 30 and the door hangers 9 and 31 of the first and second door conveying devices 5 and 27, which need to be provided for conveying the doors a, are effectively reduced in number, and the carriers 8 and 30 and the door hangers 9 and 31 thus reduced in number are effective to lighten the burden on the housing structure supporting the first and second door conveying devices 5 and 27. This results in a considerably large reduction in the expenses of facilities and in reduced noise generated by the hangers 9 and 31.

In the door storing device 10, the doors a are stored in parallel with one another in such a manner that each door a is placed on the supporting table 18 so as to stand in the direction almost perpendicular to the direction in which the supporting table 18 is forwarded by the belt conveyer 11a provided in the door storing device 10. Accordingly, the space in the door storing device 10 is saved and therefore the door storing device 10 is miniaturized in scale in its entirety. Further, on the door assembly line 26, the doors a are transported in such a manner that each door a is arranged to stand in the direction almost parallel to the forwarding direction thereof with the inner surface thereof facing to the outside, the door parts are easily mounted at each of the parts mounting stations provided along the door assembly line 26 so that the labour efficiency is improved.

In addition, since four storing compartments 11, a pair of which are positioned on right and left at the upper storey and another pair of which are positioned also on right and left at the lower storey, are provided in the door storing device 10 for storing therein the right and left front doors and the right and left rear doors respectively, the door storing device 10 is minimized in scale as a door storing device for storing the doors a mounted on the vehicle body of the four-door sedan type.

Although one illustrative embodiment of the present invention has been described in detail herein with reference to the accompanying drawings, it is to be understood that the invention is not limited thereto, and that various changes and modifications may be effected therein without departing from the scope of the present invention as defined in the appended claims. For example, the storing compartments 11 in the door storing device 10 may be arranged in a manner different from the arrangement shown in FIGS. 2 and 3 and described above, and the door storing device 10 may have therein a single storing compartment or a plurality of storing compartments of the number other than four. Furthermore, each of the first and second door conveying devices 5 and 27 may be formed into a conveyer other than the electric self-propelling conveyer shown in FIGS. 2 and 4 and described above.

What is claimed is:

1. Apparatus for assembling vehicle bodies which is operative to detach doors from vehicle bodies conveyed into the apparatus after passing through a coating process and to mount various door parts and body parts on each of the doors detached from the vehicle bodies and each of the vehicle bodies without doors, respectively, then to attach each of the doors provided with the door parts to the corresponding vehicle body provided with the body parts, the apparatus comprising:

first door conveying means for transporting the doors detached from the vehicle bodies, door storing means for storing temporarily the doors transported by said first door conveying means, door supplying means provided between said first door conveying means and said door storing means for receiving each of the doors transported by said first door conveying means with a supporting table member so as to support the same in a predetermined attitude on the supporting table member and for supplying the door supported on the supporting table member to said door storing means, door assembly line means installed on the side of an exit of said door storing means for mounting the door parts on each of the doors supported on the respective supporting table members and forwarded from said door storing means after being temporarily stored therein, and second door conveying means for transporting the doors each provided with the door parts from said door assembly line means to a door mounting station provided in a vehicle body production line to which the vehicle bodies each provided with the body parts are conveyed.

2. Apparatus for assembling vehicle bodies which is operative to detach doors from vehicle bodies conveyed into the apparatus after passing through a coating process and to mount various door parts and body parts on each of the doors detached from the vehicle bodies and each of the vehicle bodies without doors, respectively, then to attach each of the doors provided with the door parts to the corresponding vehicle body provided with the body parts, the apparatus comprising:

first door conveying means for transporting the doors detached from the vehicle bodies, said first door conveying means being formed into an electric self-propelling conveyer having a plurality of carriers, door storing means for storing temporarily the doors transported by said first door conveying means, door supplying means provided between said first door conveying means and said door storing means for receiving each of the doors transported by said first door conveying means with a supporting table member so as to support the door to stand on said supporting table member and for supplying the door supported by said supporting table member to keep standing thereon to said door storing means, door assembly line means installed on the side of an exit of said door storing means for mounting the door parts on each of the doors standing on the respective supporting table members and forwarded from said door storing means after being temporarily stored therein, and second door conveying means for transporting the door each provided with the door parts from said door assembly line means to a door mounting station provided in a vehicle body production line to which the vehicle bodies each provided with the body parts are conveyed, said second door conveying means being formed into an electric self-propellign conveyer having a plurality of carriers.

3. Apparatus for assembling vehicle bodies which is operative to detach doors from vehicle bodies conveyed into the apparatus after passing through a coating process and to mount various door parts and body parts on each of the doors detached from the vehicle bodies and each of the vehicle bodies without doors, respectively, then to attach each of the doors provided with the door parts to the corresponding vehicle body provided with the body parts, the apparatus comprising:

first door conveying means for transporting the doors detached from the vehicle bodies, door supplying means for receiving each of the doors transported by said first door conveying means with a supporting table member so as to support the door standing on said supporting table member and for supplying the door supported by said supporting table member to keep standing thereon to a successive stage, door storing means provided to be said successive stage for temporarily storing the doors supplied from said door supplying means, said door storing means including inner conveying means provided therein for forwarding the supporting table members each supplied to said door storing means from said door supplying means together with the door standing thereon to stay in said door storing means in such a manner that each of the doors stands in the direction substantially perpendicular to the direction in which the supporting table members are forwarded by said inner conveying means, door assembly line means installed on the side of an exit of said door storing means for mounting the door parts on each of the doors standing on the respective supporting table members and forwarded from said door storing means after being temporarily stored therein, and second door conveying means for transporting the doors each provided with the door parts from said door assembly line means to a door mounting station provided in a vehicle body production line to which the vehicle bodies each provided with the body parts are conveyed.

4. Apparatus for assembling vehicle bodies which is operative to detach doors from vehicle bodies conveyed into the apparatus after passing through a coating process and to mount various door parts and body parts on each of the doors detached from the vehicle bodies and each of the vehicle bodies without doors, respectively, then to attach each of the doors provided with the door parts to the corresponding vehicle body provided with the body parts, the apparatus comprising:

first door conveying means for transporting the doors detached from the vehicle bodies, door supplying means for receiving each of the doors transported by said first door conveying means with a supporting table member so as to support the door to stand on said supporting table member and for supplying the door supported by said supporting table member to keep standing thereon to a successive stage, door storing means provided to be said successive stage for temporarily storing the doors supplied from said door supplying means, said door storing means including inner conveying means provided therein for forwarding the supporting table members each supplied to said door storing means from said door supplying means together with the door standing thereon to stay in said door storing means in such a manner that each of the doors stands in the direction substantially perpendicular to the direction in which the supporting table members are forwarded by said inner conveying means, door assembly line means installed on the side of an exit of said door storing means for mounting the door parts on each of the doors standing on the respective supporting table members and forwarded from said door storing means after being temporarily stored therein, door turning means provided between said door storing means and said door assembly line means for turning each of said doors standing on the respective supporting table members forwarded from said door storing means so as to be standing in the same direction, said direction being substantially parallel to the direction in which the supporting table members are forwarded to said door assembly line means, and second door conveying means for transporting the doors each provided with the door parts from said door assembly line means to a door mounting station provided in a vehicle body production line to which the vehicle bodies each provided with the body parts are conveyed.

5. Apparatus for assembling vehicle bodies which is operative to detach doors from vehicle bodies conveyed into the apparatus after passing through a coating process and to mount various door parts and body parts on each of the doors detached from the vehicle bodies and each of the vehicle bodies without doors, respectively, then to attach each of the doors provided with the door parts to the corresponding vehicle body provided with the body parts, the apparatus comprising:

first door conveying means for transporting the doors detached from the vehicle bodies, door storing means for temporarily storing the doors transported by said first door conveying means, said door storing means comprising a plurality of storing compartments for storing the doors transported by said first door conveying means in such a manner that the doors of the same type are stored in a group in each storing compartment, door supplying means provided between said first door conveying means and said door storing means for receiving the doors transported by said first door conveying means with supporting table members respectively so as to sort the same in dependence on the types thereof and for supplying each sorted door placed on the supporting table member to a corresponding one of said storing compartments, door assembly line means installed on the side of an exit of said door storing means for mounting the door parts on each of the doors forwarded from said door storing means after being temporarily stored therein, and second door conveying means for transporting the doors each provided with the door parts from said door assembly line means to a door mounting station provided in a vehicle body production line to which the vehicle bodies each provided with the body parts are conveyed.

6. Apparatus according to claim 5 further comprising door transferring means for transferring each of the doors transported by said first door conveying means to the supporting table member provided on said door supplying means.

7. Apparatus according to claim 5 further comprising door taking out means for taking out each of the sorted doors placed on the respective supporting table members and stored temporarily in the respective storing compartments from said door storing means so as to forward the same toward said door assembly line means.

8. Apparatus according to claim 7 wherein each of said storing compartments includes inner conveying means provided therein for forwarding the supporting table members each supplied to said storing compartment from said door supplying means together with the sorted door placed thereon and causing the sorted doors placed on the supporting table members to stay in said storing compartment in such a manner that each of the sorted doors stands in the direction substantially perpendicular to the direction in which the supporting table members are forwarded by said inner conveying means.

9. Apparatus according to claim 8 further comprising door turning means for turning each of the doors placed on the respective supporting table members and taken out by said door taking out means from the respective storing compartments so as to be standing in the same direction, said direction being substantially parallel to the direction in which the supporting table members are forwarded to said door assembly line means.

* * * * *